US006549387B1

(12) United States Patent
Nakamura et al.

(10) Patent No.: US 6,549,387 B1
(45) Date of Patent: Apr. 15, 2003

(54) POWER BREAKER

(75) Inventors: Goro Nakamura, Shizuoka-ken (JP); Takahiro Sato, Shizuoka-ken (JP)

(73) Assignee: Yazaki Corporation, Tokyo (JP)

(*) Notice: Subject to any disclaimer, the term of this patent is extended or adjusted under 35 U.S.C. 154(b) by 232 days.

(21) Appl. No.: 09/642,941

(22) Filed: Aug. 22, 2000

(30) Foreign Application Priority Data

Aug. 23, 1999 (JP) ........................................... 11-236106

(51) Int. Cl.[7] .......................... H02H 3/027; H02H 3/00; H02H 5/04

(52) U.S. Cl. ........................ 361/93.1; 361/42; 361/103; 361/104

(58) Field of Search ......................... 361/93.1, 42, 103, 361/104, 249; 335/16, 18, 124, 126, 128, 157, 298, 401, 405

(56) References Cited

U.S. PATENT DOCUMENTS 4,906,967 A * 3/1990 Winter ....................... 335/172
5,124,679 A * 6/1992 Kanazawa ................... 335/18
5,808,253 A 9/1998 Hatakeyama
6,000,491 A * 12/1999 Shimizu et al. ............. 180/444
6,078,108 A 6/2000 Froschl
6,308,566 B1 * 10/2001 Matsumoto et al. .......... 73/146
6,333,845 B1 * 12/2001 Hashizawa et al. ......... 361/642
6,386,164 B1 * 5/2002 Mikame et al. .......... 123/90.17
6,445,563 B1 * 9/2002 Endo .......................... 361/250

FOREIGN PATENT DOCUMENTS

GB 2 204 734 A 11/1988
JP 8-279327 10/1996
JP 9-251830 9/1997
JP 11-301376 11/1999

* cited by examiner

*Primary Examiner*—Stephen W. Jackson
*Assistant Examiner*—Danny Nguyen
(74) *Attorney, Agent, or Firm*—Finnegan, Henderson, Farabow, Garrett & Dunner, L.L.P.

(57) ABSTRACT

A reset knob 20 is mounted to a tip end of a shaft 16. A torsion spring 21 and a returning motion-preventing lock 22 are bent and accommodated in the reset knob 20. The returning motion-preventing lock 22 can rotate around a reset-knob fulcrum 20*a* of the reset knob 20 by a load of the torsion spring 21. Therefore, the returning motion-preventing lock 22 jumps out from inside of the reset knob 20 which is firmly connected together with the shaft 16 by a force of the torsion spring 21, thereby preventing the shaft 16 and the reset knob 20 from returning to an initial position. Further, since the returning motion-preventing lock 22 can easily be accommodated in the reset knob 20 manually, a reset operation for returning the shaft 16 to its original initial position can be carried out easily.

4 Claims, 4 Drawing Sheets

POWER BREAKER

BACKGROUND OF THE INVENTION

The present invention relates to a power breaker for interrupting a power circuit utilizing sublimation of a gas starting agent for example, and more particularly, to a resettable power breaker in which after a power circuit is forcibly interrupted when abnormal conditions were encountered or a short circuit, collision of vehicle or the like occurred, it is possible to reliably prevent the power circuit from being energized again by impact, vibration or other external force.

Japanese Patent Application Laid-open No. H11-301376 discloses a structure in which in a power breaker in which can forcibly interrupt a power circuit when abnormal conditions were encountered or a short circuit, collision of vehicle or the like occurred. However, a structure of the above-described conventional power breaker as the following problem. That is, since there is no function for holding the shaft at the interruption position after the shaft was slid to the interruption position to interrupt between the terminals, there is an adverse possibility that the shaft may be returned to the initial position by reaction force, impact, vibration caused by the projecting motion of the shaft or by external force, and the terminals may be electrically connected to each other.

Japanese Patent Application Laid-open No. H9-251830 discloses a structure in which in a power breaker having two terminals for making and breaking a power circuit and capable of connecting and separating the two terminals to and from each other by sliding movement of a shaft. In the case of a returning motion-preventing lock used in the disclosed technique, there is a problem that although the shaft can be locked at the interruption position, this lock can not be released to return the shaft to the initial position.

SUMMARY OF THE INVENTION

In view of the above circumstances, it is an object of the present invention to provide a resettable power breaker in which after a power circuit is forcibly interrupted when abnormal conditions were encountered or a short circuit, collision of vehicle or the like occurred, it is possible to reliably prevent the power circuit from being energized again by impact, vibration or other external force.

To achieve the above object, according to a first aspect of the present invention, there is provided a power breaker comprising a pair of terminals inserted in a power circuit for connecting a battery of a vehicle and loads provided in various portions of the vehicle, and a shaft capable of connecting and separating the terminals to and from each other by sliding movement of the shaft, in which the shaft is slid from an initial position where the terminals are connected to each other to an interruption position where the terminals are separated from each other, thereby interrupting the power circuit, wherein the shaft is provided at its one end with a returning motion-preventing lock which jumps out from the shaft when the shaft interrupts the power circuit to prevent the shaft from returning to the initial position.

According to the first aspect, the shaft capable of connecting and separating the two terminals with and from each other to energize and interrupt the power circuit is provided at its one end with a returning motion-preventing lock which jumps out from the shaft when the shaft interrupts the power circuit to prevent the shaft from returning to the initial position. Therefore, the shaft can be held at, the interruption position by the returning motion-preventing lock, and it is possible to reliably prevent the power circuit from being energized again by impact, vibration or other external force after a power circuit is forcibly interrupted when abnormal conditions were encountered or a short circuit, collision of vehicle or the like occurred.

Accordingly, since the returning motion-preventing lock jumps out from the shaft when the shaft interrupts the power circuit, a reset operation for returning the shaft to its original initial position can be carried out easily.

In a second aspect of the present invention, the returning motion-preventing lock is accommodated in a reset knob mounted to one end of the shaft together with a resilient member, and the returning motion-preventing lock jumps out by a force of the resilient member when the shaft interrupts the power circuit.

According to the second aspect, since the returning motion-preventing lock can easily be accommodated in the reset knob manually, the reset operation for returning the shaft to the original initial position can be carried out easily.

In a third aspect of the present invention, the resilient member is a torsion spring provided in the reset knob and acting around the reset knob fulcrum.

According to the third aspect, since the torsion spring exerts a force in an opening direction to the returning motion-preventing lock around the reset knob. Further, since the returning motion-preventing lock can easily be accommodated in the reset knob manually, the reset operation for returning the shaft to the original initial position can be carried out easily.

In a fourth aspect of the present invention, the returning motion-preventing lock is provided with a claw engaged with an apparatus body when the returning motion-preventing lock jumps out from the shaft, thereby preventing the shaft from falling out from the apparatus body.

According to the fourth aspect, the returning motion-preventing lock is provided with a claw engaged with an apparatus body when the returning motion-preventing lock jumps out from the shaft, thereby preventing the shaft from falling out from the apparatus body. Therefore, the reset operation for returning the shaft to the original initial position is not interrupted.

DESCRIPTION OF PREFERRED EMBODIMENT

Figure 1:
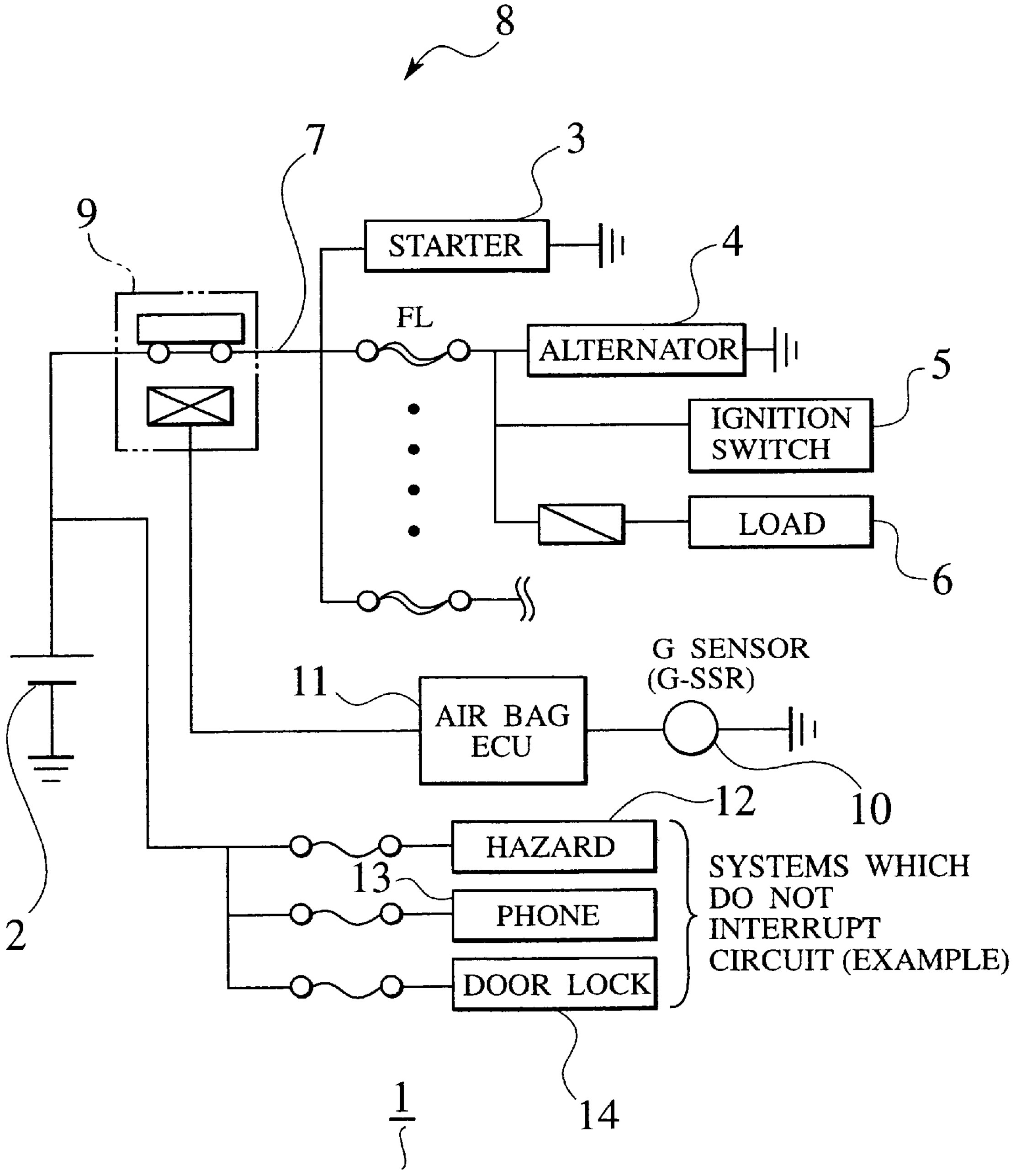
FIG. 1 is a block diagram showing one example of electrical equipment system to which a power breaker of the present invention is applied.

FIG. 1 is a block diagram showing one example of electrical equipment system to which a power breaker of the present invention is applied. As shown in FIG. 1, in this electrical equipment system 1, a starter 3, an alternator 4, an ignition switch (IGN.SW) 5, and other loads such as a load 6 provided in various portions of a vehicle are connected to a battery 2 of the vehicle through a wire harness 8 having an electric wire 7. A power breaker 9 of the present invention is interposed in the power circuit. A number 10 represents a G-sensor (G-SSR), and a number 11 represents an air bag ECU. They are used for operating the power breaker 9. A number 12 represents a hazard, a number 13 represents a phone (PHONE), and a number 14 represents a door lock (D/L). They are examples of system structural articles which do not interrupt the power circuit by the power breaker 9.

Figure 2:
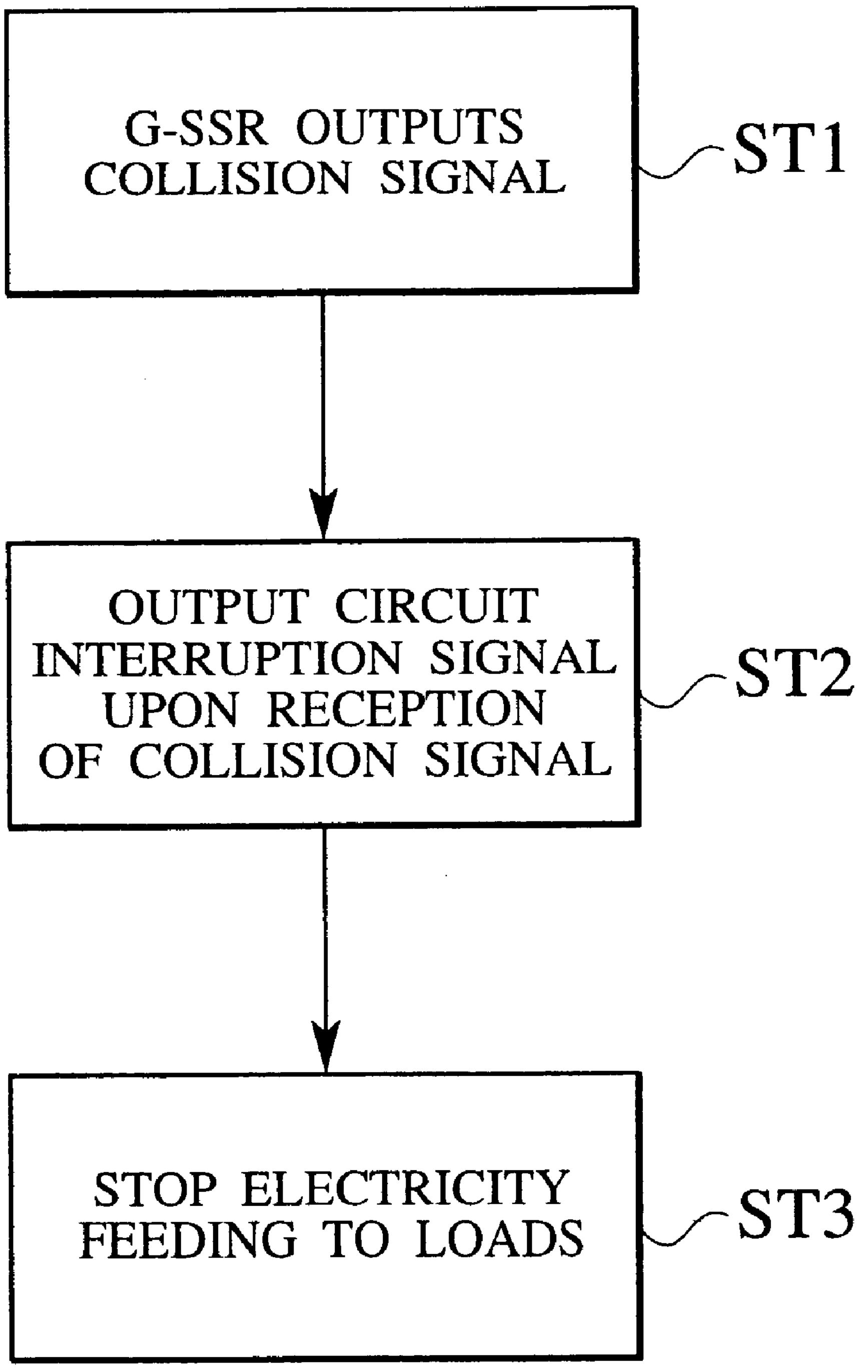
FIG. 2 is a flowchart showing an interrupting flow of the electrical equipment system shown in FIG. 1.

According to this electrical equipment system 1, as shown in an interruption flow of FIG. 2, if the subject vehicle collided against an object such as another vehicle ahead and a collision signal was output from the G-sensor (G-SSR) 10 to the air bag ECU11, (Step ST1), a circuit interrupting signal is generated in the air bag ECU11, and this generated circuit interrupting signal is output to the power breaker 9 (step ST2).

With this signal, the power breaker 9 can interrupt the power circuit to stop the electric supply from the battery 2 to the various loads such as the starter 3, the alternator 4, the ignition switch (IGN.SW) 5 (step ST3) as will be explained below based on FIGS. 3 through 6.

With this signal, the power breaker 9 can interrupt the power circuit to stop the electric supply from the battery 2 to the various loads such as the starter 3, the alternator 4, the ignition switch (IGN.SW) 5 (step ST203) as will be explained below based on FIGS. 3 to 6.

Figure 3:
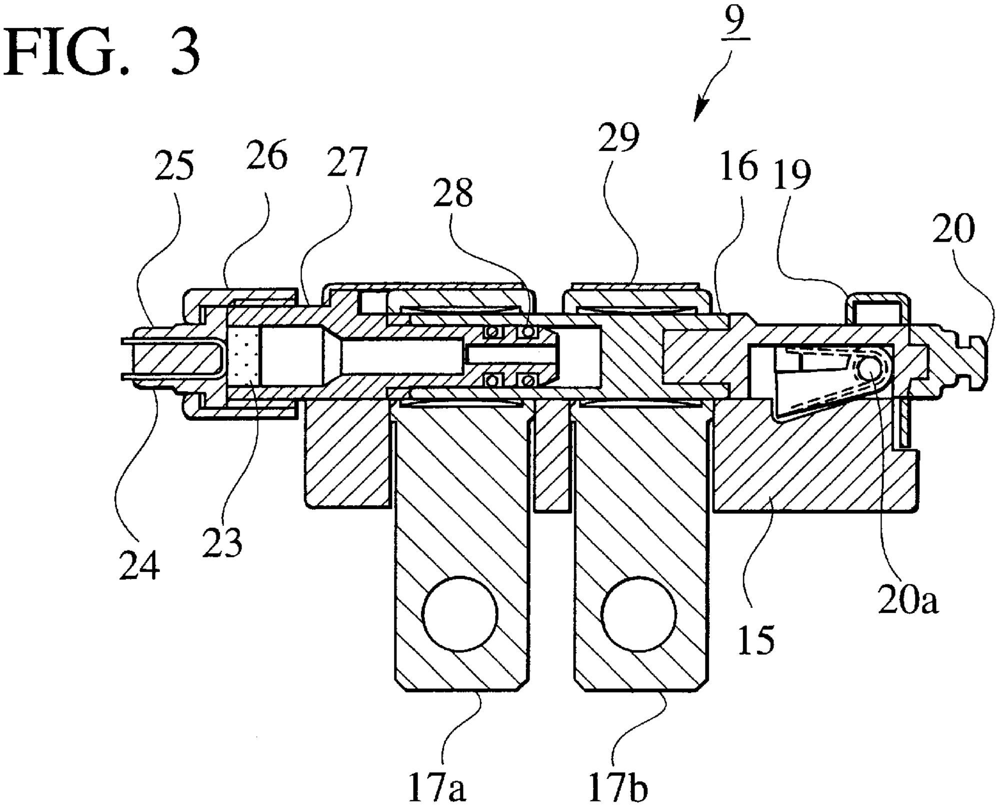
FIG. 3 is a sectional side view of an essential portion of an embodiment of the gas-type power breaker in its initial state before it is operated.
Figure 4:
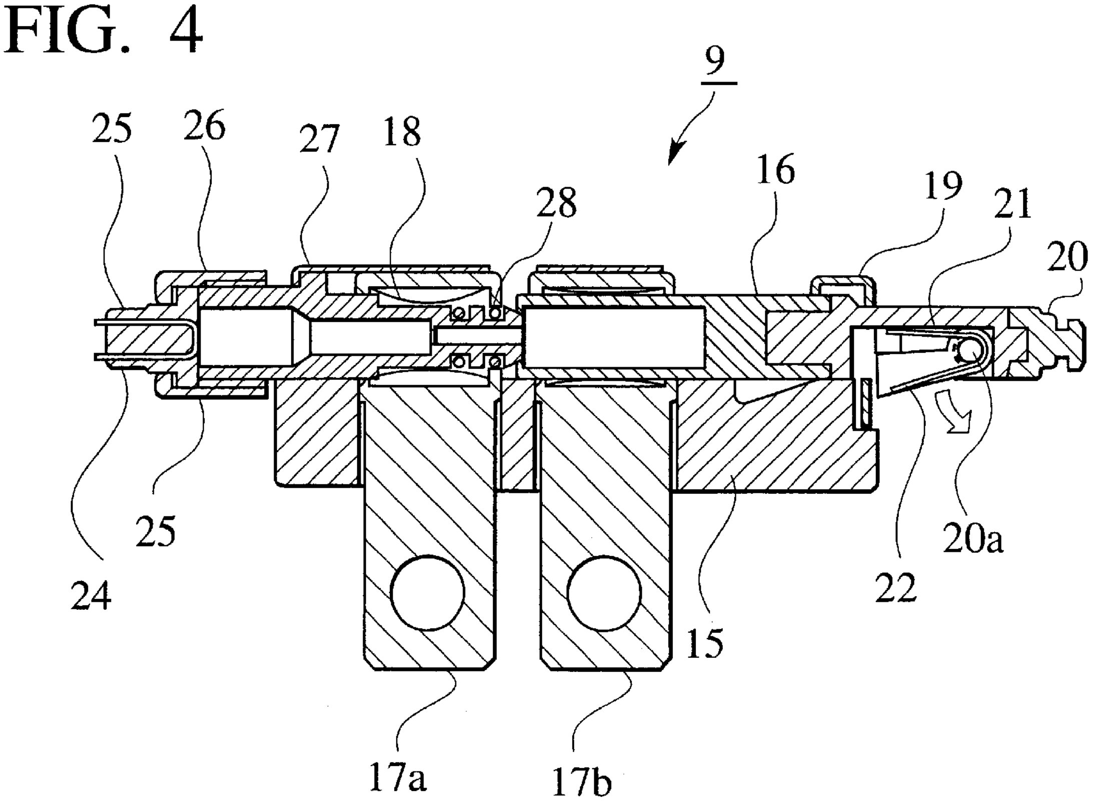
FIG. 4 is a sectional side view of an essential portion of the one example of the gas-type power breaker in its interruption state after it was operated.

FIGS. 3 and 4 show a structure of one embodiment of the power breaker 9 of the present invention. FIG. 3 is a sectional side view of an essential portion of an embodiment of the gas-type power breaker in its initial state before it is operated, and FIG. 4 is a sectional side view of an essential portion of the one example of the gas-type power breaker in its interruption state after it was operated.

In the power breaker 9, a shaft 16 is inserted in a base body (apparatus body) 15, and the power breaker 9 includes terminals 17*a*, 17*b* which are connected to each other for feeding electricity from the battery 2 to each of the loads such as the starter 3 and the alternator 4.

In an initial state before the power breaker 9 is operated, the terminals 17*a*, 17*b* are electrically connected to each other by the shaft 16. Therefore, a current of the power circuit flows from terminal 17*a*→ shaft 16→ terminal 17*b*. Since the terminals 17*a*, 17*b* are in contact with the multi-point connection spring 18 at contacts, a large current can flow through the terminals 17*a*, 17*b*.

In this power breaker 9, a reset knob 20 is mounted to a tip end of the shaft 16 using a stopper 19, and a torsion spring 21 and a returning motion-preventing lock 22 are bent and accommodated in the reset knob 20.

Figure 5:
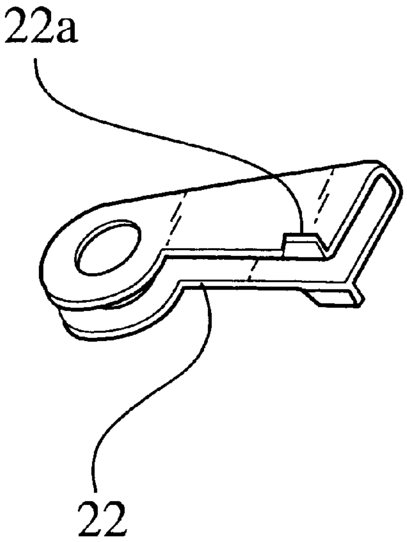
FIG. 5 is a detailed explanatory view of a returning motion-preventing lock.

The returning motion-preventing lock 22 can be rotated around a reset-knob fulcrum 20*a* of the reset knob 20 by a load of the torsion spring 21. Further, as shown in FIG. 5, the returning motion-preventing lock 22 is provided with a claw 22*a* so that the returning motion-preventing lock 22 will not rotate beyond a predetermined rotational angular position to prevent the shaft 16 from falling out from the base body 15.

An ignitor 24 accommodating a gas starting agent 23 therein is mounted to a rear end of the shaft 16. In FIG. 5, a number 25 represents a starting-agent case, a number 26 represents a nozzle, a number 27 represents a nozzle-mounting plate, a number 28 represents an O-ring, and a number 29 represents a terminal-mounting plate.

In such an assembling structure, when gas is generated by sublimation of the gas starting agent 23, the shaft 16 and the reset knob 20 are moved by this gas pressure to an interruption state shown in FIG. 1 in which the shaft 16 and the reset knob 20 are projected from the base body 15.

In this state, the returning motion-preventing lock 22 jumps out from inside of the reset knob 20 firmly connected together with the shaft 16, and it is possible to prevent the shaft 16 and the reset knob 20 from returning to the initial position.

Therefore, the shaft 16 can be held at the interruption position by the returning motion-preventing lock 22, and it is possible to reliably prevent the power circuit from being energized again by impact, vibration or other external force after a power circuit is forcibly interrupted when abnormal conditions were encountered or a short circuit, collision of vehicle or the like occurred.

Figure 6:
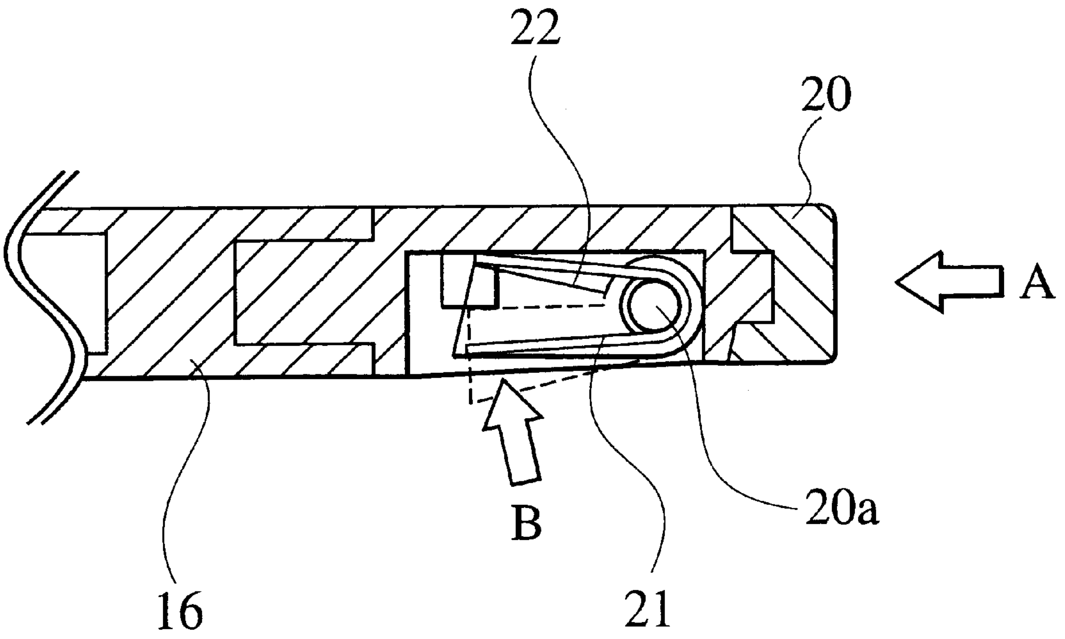
FIG. 6 is a detailed explanatory view for explaining a manual operation for accommodating the returning motion-preventing lock in a reset knob.

The returning motion-preventing lock 22 jumps out from inside of the reset knob 20 firmly connected together with the shaft 16 by a force of the torsion spring 21 at the time of the interrupting operation of the shaft. Therefore, as shown in FIG. 6, the returning motion-preventing lock 22 can easily be inserted manually into the reset knob 20 in a direction of arrow A while pushing the returning motion-preventing lock 22 in a direction of arrow B (while preventing the returning motion-preventing lock 22 from jumping out).

When the returning motion-preventing lock 22 jumps out from inside of the reset knob 20, the claw 22*a* provided on the returning motion-preventing lock 22 engages the base body 15 to prevent the shaft 16 from falling out from the base body 15. Therefore, the reset operation for returning the shaft 16 to the original initial position is not interrupted.

Since the returning motion-preventing lock 22 can easily be accommodated in the reset knob 20 manually and the shaft 16 can be prevented from falling out from the base body 15 in this manner, the reset operation for returning the shaft 16 to the original initial position can be carried out easily.

In the present invention, as a resilient member provided in the reset knob 20 mounted to one end of the shaft 16, a compression spring or a rubber may be used instead of the torsion spring. Any member may be used as the resilient member only if it can reliably bias the returning motion-preventing lock outward at the time of the interrupting operation of the shaft.

What is claimed is:

1. A power breaker comprising:

a pair of terminals inserted in a power circuit for connecting a battery of a vehicle to loads provided in various portions of the vehicle; and a shaft capable of connecting and separating said terminals to and from each other via sliding movement of said shaft, said shaft being movable from an initial position where said terminals are connected to each other to an interruption position where said terminals are separated from each other, thereby interrupting said power circuit, wherein said shaft comprises one end having a returning motion-preventing lock which projects from said shaft when said shaft interrupts said power circuit to prevent said shaft from returning to said initial position.

2. The power breaker of claim 1, wherein said returning motion-preventing lock is accommodated in a reset knob mounted to the one end of said shaft together with a resilient member, and said returning motion-preventing lock projects by a force of said resilient member when said shaft interrupts said power circuit.

3. The power breaker of claim 2, wherein said resilient member comprises a torsion spring biasing said returning motion-preventing lock outward.

4. The power breaker of claim 1, wherein said returning motion-preventing lock comprises a claw engaged with an apparatus body when said returning motion-preventing lock projects from said shaft, thereby preventing said shaft from falling out from said apparatus body.

* * * * *